United States Patent
Park et al.

(10) Patent No.: US 9,207,746 B2
(45) Date of Patent: Dec. 8, 2015

(54) METHOD AND APPARATUS FOR CONTROLLING SLEEP MODE IN A PORTABLE TERMINAL

(71) Applicant: Samsung Electronics Co., Ltd., Gyeonggi-do (KR)

(72) Inventors: Sehwan Park, Gyeonggi-do (KR); Youngjoo Park, Gyeonggi-do (KR); Jinhee Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 13/653,974

(22) Filed: Oct. 17, 2012

(65) Prior Publication Data

US 2013/0097447 A1   Apr. 18, 2013

(30) Foreign Application Priority Data

Oct. 17, 2011  (KR) .......................... 10-2011-0105758

(51) Int. Cl.
*G06F 1/32* (2006.01)

(52) U.S. Cl.
CPC ............ *G06F 1/3246* (2013.01); *G06F 1/3228* (2013.01)

(58) Field of Classification Search
None
See application file for complete search history.

(56) References Cited

U.S. PATENT DOCUMENTS

| 5,894,331 | A | * | 4/1999 | Yang .............................. 348/730 |
| 2006/0053315 | A1 | * | 3/2006 | Menzl ........................... 713/300 |
| 2009/0150698 | A1 | | 6/2009 | Lee |
| 2011/0022859 | A1 | * | 1/2011 | More et al. .................... 713/300 |

FOREIGN PATENT DOCUMENTS

KR   1020040033685   4/2004

* cited by examiner

*Primary Examiner* — Paul Yanchus, III
(74) *Attorney, Agent, or Firm* — The Farrell Law Firm, P.C.

(57) ABSTRACT

A method of controlling a sleep mode of a portable terminal is provided. The method includes setting a sleep mode timer according to a default setting; displaying, upon reaching a predetermined time point before expiration of the sleep mode timer, a notice screen including the sleep mode timer and a timer setting area for re-setting the sleep mode timer according to a temporary setting; and entering, when a sleep mode timer temporary resetting command is received while the notice screen is displayed, a screen maintaining mode in which the sleep mode timer is temporarily re-set from the default setting to a temporary setting according to the sleep mode timer temporary resetting command.

18 Claims, 8 Drawing Sheets

METHOD AND APPARATUS FOR CONTROLLING SLEEP MODE IN A PORTABLE TERMINAL

PRIORITY

This application claims priority under 35 U.S.C. §119(a) to a Korean patent application filed on Oct. 17, 2011 in the Korean Intellectual Property Office and assigned Serial No. 10-2011-0105758, the entire content of which is incorporated herein by reference.

BACKGROUND OF THE INVENTION

1. Field of the Invention

The present invention relates to a method and an apparatus for controlling a sleep mode in a portable terminal, and more particularly, to a method and an apparatus for controlling a sleep mode in a portable terminal in which a notice screen is displayed before entering the sleep mode in order to temporarily set a sleep mode timer setting and operate a screen maintaining mode such that the portable terminal does not switch to the sleep mode until a sleep mode timer expires.

2. Description of the Related Art

Recently, portable terminals have become capable of providing voice call services, various data transmission services, and other value-added services, thus evolving such portable terminals into multimedia devices. Therefore, the usage time of portable terminals has increased, and various methods are being used to increase battery life of these terminals. One such method is to cut off a power supply to a portion of peripheral devices, such as a display, and enter into a sleep mode in order to reduce power consumption when there is no user input during a predetermined time period.

FIG. 1 is a diagram illustrating a conventional process of entering into a sleep mode in a portable terminal.

As shown in FIG. 1, according to a sleep mode timer setting set by a user in advance, when no user input is received for a predetermined period of time while a screen as shown in FIG. 1(a) is displayed, a portable terminal enters into a sleep mode as shown in FIG. 1(b). When the portable terminal enters into the sleep mode, power to a portion of peripheral devices is cut off such that, for example, an LCD screen is turned off.

As shown in FIG. 1(b), when the portable terminal enters into the sleep mode, the LCD screen is turned off, which is inconvenient when the user needs to release the sleep mode to check an operation of the portable terminal.

Until recently, content available to portable terminals was limited and did not require a significant amount of storage. However, recently, the content available to portable terminals has been diversified and has also increased in size such that a designated time for entering a sleep mode may arrive while a user gathers content with a high volume of information.

When a portable terminal enters into a sleep mode while the content is gathered, this transition causes an inconvenience in that the user must wake up the portable terminal from the sleep mode. When the content has a very large volume or the time set for entering into the sleep mode is short, the above process may be repeated several times. However, if the time for entering into the sleep mode is set long enough to avoid the above-described scenario, unnecessary power consumption is incurred.

SUMMARY OF THE INVENTION

An aspect of embodiments of the present invention is to address the above-described problems and/or disadvantages, and to provide the advantages described below. Accordingly as aspect of embodiments of the present invention is to provide a method and an apparatus for controlling a sleep mode in a portable terminal in which a notice screen is displayed prior to entering to the sleep mode to temporarily set sleep mode timer setting.

In accordance with an aspect of the present invention, a method of controlling a sleep mode of a portable terminal is provided. The method includes setting a sleep mode timer according to a default setting; displaying, upon reaching a predetermined time point before expiration of the sleep mode timer, a notice screen including the sleep mode timer and a timer setting area for re-setting the sleep mode timer according to a temporary setting; and entering, when a sleep mode timer temporary resetting command is received while the notice screen is displayed, a screen maintaining mode in which the sleep mode timer is temporarily re-set from the default setting to a temporary setting according to the sleep mode timer temporary resetting command.

In accordance with another aspect of the present invention, a portable terminal having a sleep mode control function is provided. The portable terminal includes a key input unit for receiving a user command corresponding to a timer setting; a storage unit for storing the timer setting; a controller for setting a sleep mode timer according to a default setting for controlling, upon reaching a predetermined time point before expiration of the sleep mode timer, display of a notice screen including the sleep mode timer and a timer setting area for re-setting the sleep mode timer according to a temporary setting, and for entering, when a sleep mode timer temporary resetting command is received while the notice screen is displayed, a screen maintaining mode in which the sleep mode timer is temporarily re-set from the default setting to a temporary setting according to the sleep mode timer temporary resetting command; and a display unit for displaying the notice screen.

BRIEF DESCRIPTION OF THE DRAWINGS

The aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described as follows with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Herein, the term "sleep mode" refers to a state in which power is not provided to certain peripheral devices of a portable terminal, such as a Liquid Crystal Display (LCD), or a state in which only a minimum level of power is provided to certain peripheral devices of the portable terminal in a standby state of the portable terminal, in order to reduce power consumption when input from a user of the portable terminal is not received during a predetermined time.

Herein, the term "screen maintaining mode" refers to a state in which a standby screen is maintained instead of switching to the sleep mode even if the input from the user of the portable terminal is not received during the predetermined time for entering sleep mode.

According to embodiments of the present invention, prior to entering into the sleep mode, a notice screen is displayed in order to enable the user to temporarily set the sleep mode timer setting, thereby improving user convenience.

Figure 1:
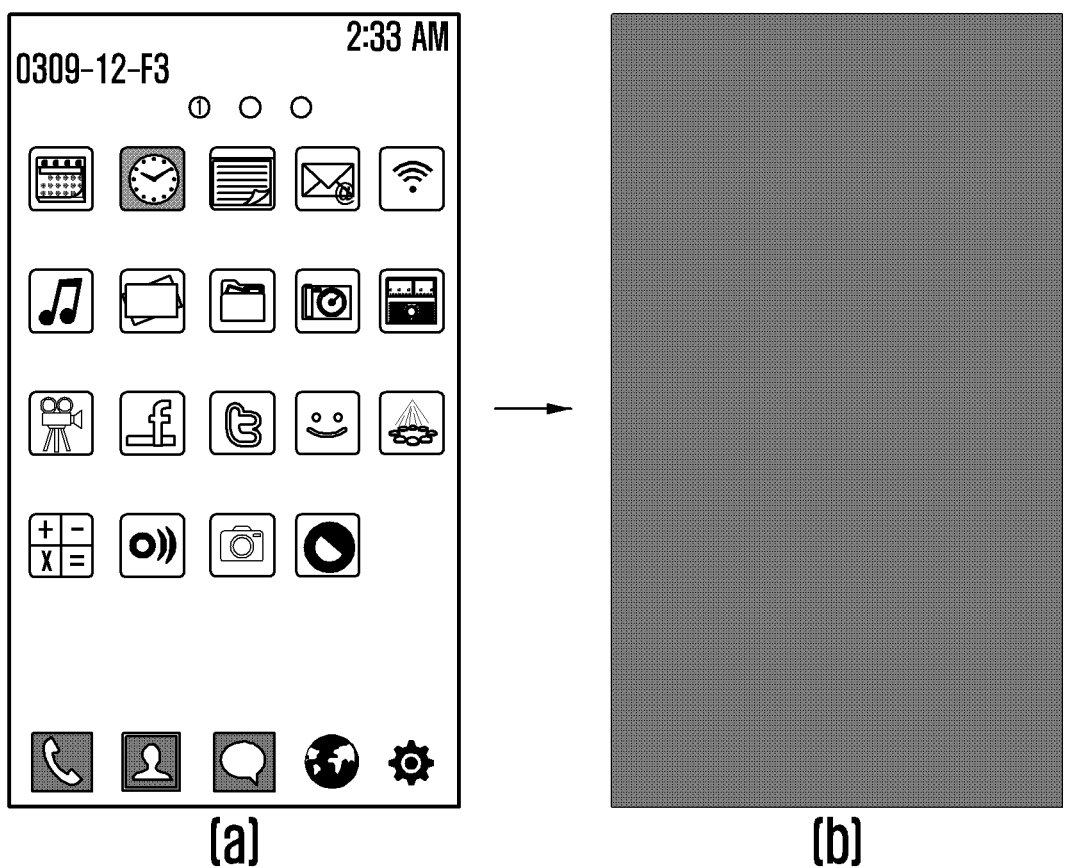
FIG. 1(a) is a diagram illustrating a standby screen in a portable terminal before a sleep mode is performed.
FIG. 1(b) is a diagram illustrating a screen for a sleep mode in a portable terminal after the sleep mode is performed.
Figure 2:
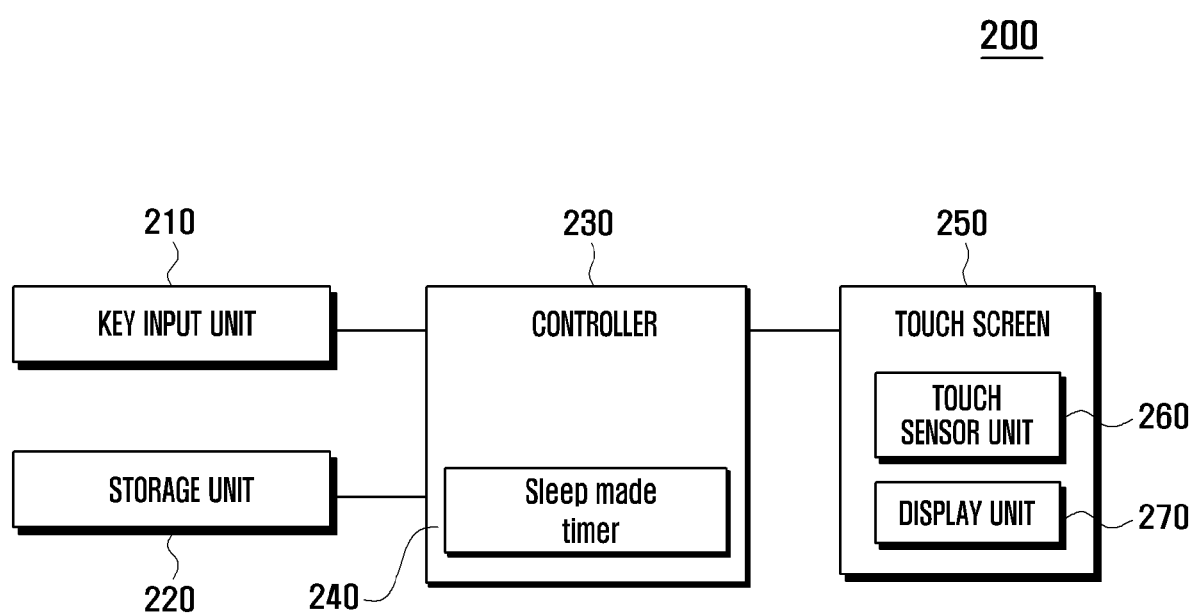
FIG. 2 is a block diagram illustrating an internal configuration of a portable terminal according to an embodiment of the present invention.

FIG. 2 is a block diagram illustrating an internal configuration of a portable terminal according to an embodiment of the present invention.

A key input unit 210 receives input corresponding to a user's key manipulations for controlling the portable terminal 200 and generates an input signal to be transmitted to a controller 230. The input unit 210 may include a keypad having number keys and arrow keys, and include a predetermined function key on a surface of the portable terminal 200. According to some embodiments of the present invention, the key input unit 210 may be omitted, such as when a user can control the portable terminal exclusively through a touch screen unit 250.

A storage unit 220 stores programs and data required for operating the portable terminal 200, and may include a corresponding program area and data area. The program area may include, for example, a program that controls an overall operation of the portable terminal 200, an Operating System (OS) that boots the portable terminal 200, an application program required for reproducing a multimedia content, an application program required for other optional functions of the portable terminal such as, for example, a camera function, a sound reproducing function, or an image or a video reproducing function. In the data area, a data generated according to use of the portable terminal 200 is stored and an image, a video, a phonebook, or an audio data may be stored therein. According to an embodiment of the present invention, the storage unit 220 may also store the sleep mode timer setting therein.

The touch screen unit 250 includes a touch sensor unit 260 and a display unit 270. The touch sensor unit 260 detects a touch input of the user. The touch sensor unit 260 includes a pressure detection sensor, or a touch detection sensor such as a capacitive overlay, a resistive overlay, or an infrared beam. In addition to or as an alternative to the sensors described above, all other types of sensor devices capable of detecting a touch or a pressure by an object may be used for the touch sensor unit 260 in accordance with embodiments of the present invention.

The touch sensor unit 260 detects a touch input of the user and generates a detection signal to be transmitted to the controller 230. The detection signal includes coordinate data indicating a location at which a touch is received by the user. When the user inputs a touch location moving gesture, the touch sensor unit 260 generates the detection signal including the coordinate data of a touch location movement path and transmits the detection signal to the controller 260.

More specifically, the touch sensor unit 260 detects a user input for temporarily setting the sleep mode timer. Such user inputs may include, for example, a touch (or a multi-touch) and a drag.

The display unit 270 may be formed as a Liquid Crystal Display (LCD), an Organics Light Emitting Diode (OLED), or an Active Matrix Organic Light Emitting Diode (AMOLED) and visually provides the user with a menu, an input data, function setting information, and other various information of the portable terminal 200. The display unit 270 outputs screens such as a booting screen, a standby screen, a menu screen, a call screen, and/or other application screens.

The portable terminal 200 according to embodiments of the present invention may include the touch screen as described above, however, embodiments of the present invention are not limited to portable terminals that include a touch screen. When embodiments of the present invention are applied to portable terminals that do not include a touch screen, the touch screen unit 250 shown in FIG. 2 may be modified to include only the display unit 270.

The controller 230 controls overall operations of each element of the portable terminal. More specifically, according to an embodiment of the present invention, the controller 230 sets a default setting of the sleep mode timer and a time point for displaying the notice screen. Upon reaching a time point for displaying the notice screen, the controller 230 controls display of the notice screen including a timer display area for displaying the sleep mode timer and a timer setting area for setting the sleep mode timer setting. The controller also controls the display unit 270 such that, when the sleep mode timer setting is temporarily set through the timer setting area, a screen maintaining mode is entered, thereby preventing the screen of the portable terminal from switching to the sleep mode and, when the sleep mode timer setting is not temporarily set through the timer setting area, the screen of the portable terminal enters to the sleep mode. To this end, the controller 230 may further include a sleep mode timer 240.

The sleep mode timer 240 is driven according to the sleep mode timer setting. According to an embodiment of the present invention, when the sleep mode timer 240 expires, the portable terminal 200 enters the sleep mode. Generally, the sleep mode timer 240 is driven according to a default setting set by the user in advance and stored in the storage unit 220. However, the sleep mode timer setting may be temporarily set in the notice screen displayed on the display unit 270, prior to entering to the sleep mode.

In the above-described example according to FIG. 2, the controller 230 and the sleep mode timer 240 are separate blocks that perform different functions. However, this example is merely for illustrative purposes and embodiments of the present invention are not limited thereto. For example, a particular function performed by the sleep mode timer 240 may be performed by the controller 230 in accordance with embodiments of the present invention.

Figure 3:
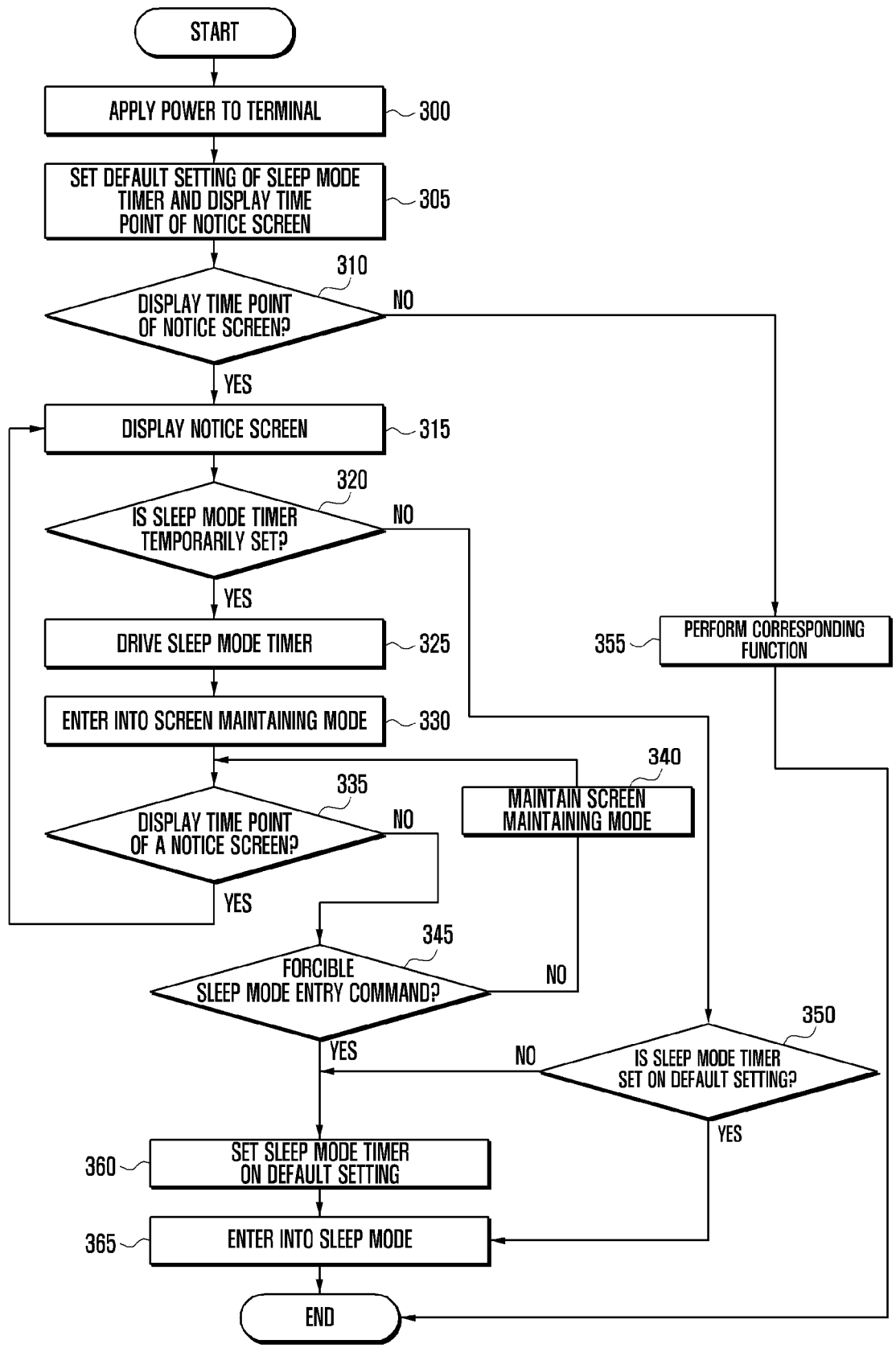
FIG. 3 is a flow chart illustrating a method of controlling a sleep mode according to an embodiment of the present invention.

FIG. 3 is a flow chart illustrating a method of controlling a sleep mode according to an embodiment of the present invention.

Referring to FIG. 3, the controller 230 detects that power is applied to the potable terminal 200, in step 300. Next, the controller 230 receives the default setting of the sleep mode timer and the time point for displaying the notice screen from the user, in step 305. Here, the time point for displaying the notice screen refers to a time point at which the notice screen is displayed by the display unit 270 before the sleep mode timer 240 expires. For example, the display time point of the notice screen may be set as five seconds prior to expiration of the sleep mode timer 240. It is not necessary to perform a process of receiving the sleep mode timer setting and the display time point of the notice screen from the user each time power is applied to the portable terminal 200. When the sleep mode timer setting or the display time point of the notice screen is not received from the user, the controller 230 operates according to a default setting stored in the storage unit 220 in advance.

The controller 230 determines whether the display time point of the notice screen arrives, in step 310. For example, when the sleep mode timer setting is 20 seconds and the display time point of the notice screen is 5 seconds prior to the expiration of the sleep mode timer, the notice screen is displayed 15 seconds after driving the sleep mode timer.

When the controller 230 determines that the display time point of the notice screen has not arrived (e.g., if a request to perform another function is received before the display time point of the notice screen arrives), the controller 230 performs a corresponding function, in step 355. However, when the controller 230 determines that the display time point of the notice screen has arrived, the controller 230 controls the display unit 270 to display the notice screen, in step 315. In the above example, when no user input for fifteen seconds after driving the sleep mode timer, the notice screen is displayed on the display unit 270.

Figure 4:
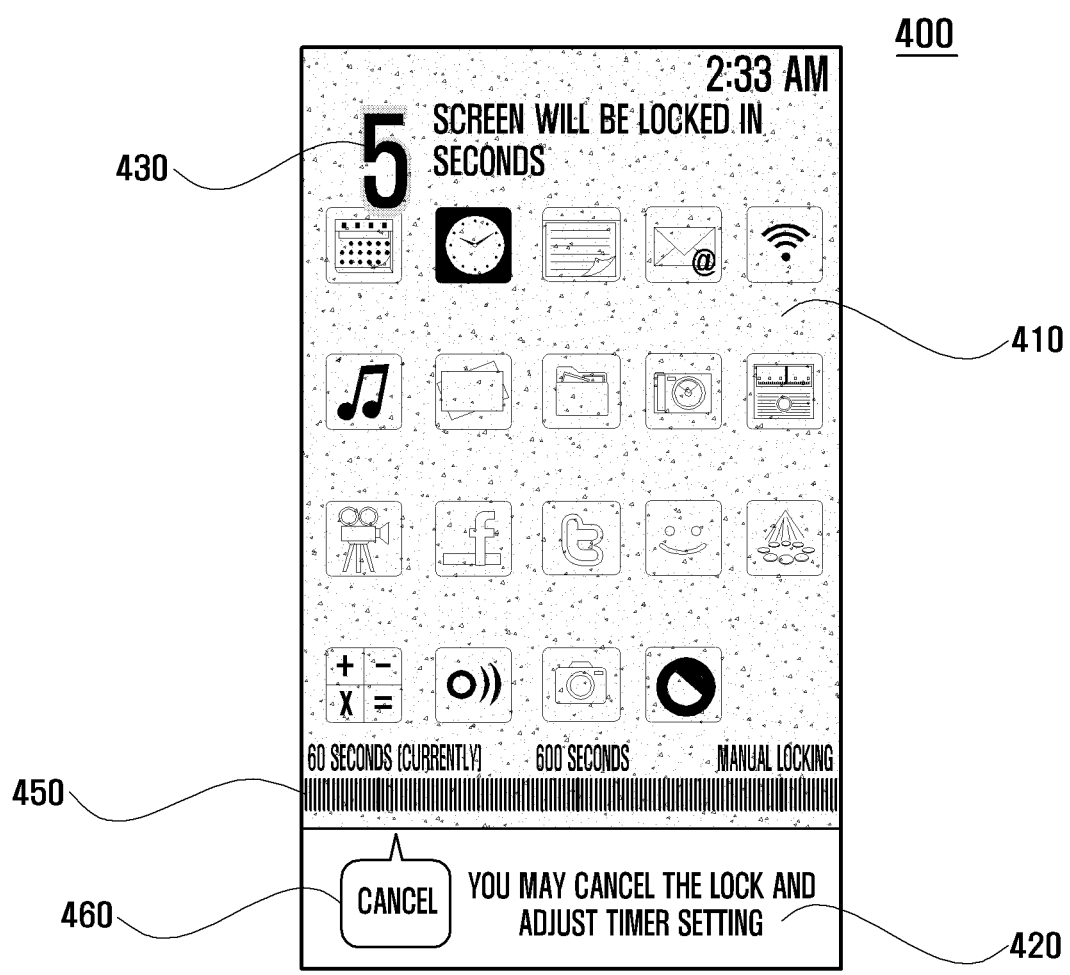
FIG. 4 is a diagram illustrating a notice screen according to an embodiment of the present invention.
Figure 6:
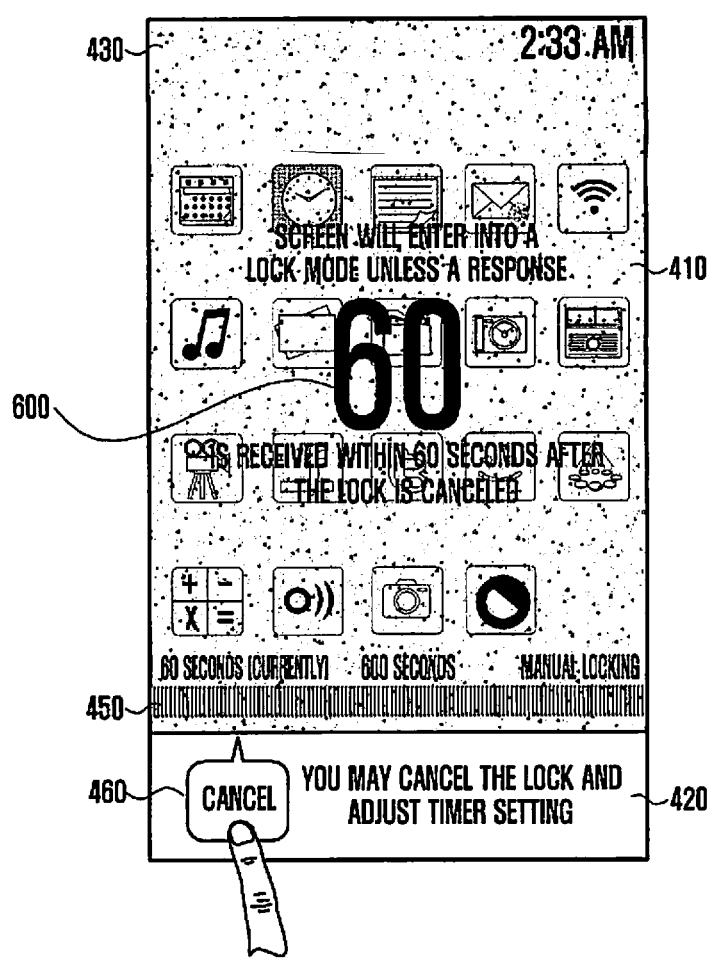
FIG. 6 is a diagram illustrating a screen for temporarily setting a sleep mode timer according to an embodiment of the present invention.

The notice screen displayed on the display unit 270 is shown in FIGS. 4 and 6. FIG. 6 is a diagram illustrating a screen for setting a sleep mode timer in a notice screen according to an embodiment of the present invention, which will be illustrated later. FIG. 4 is a diagram illustrating a notice screen according to an embodiment of the present invention.

A notice screen 400 includes a timer display area 410 and a timer setting area 420, and a background is dimmed at a level below a reference value. The timer display area 410 includes a timer setting time corresponding to a time remaining until the portable terminal enters the sleep mode or a time corresponding to a temporary timer setting 430. The time remaining until the sleep mode is entered may be displayed when the notice screen is set and displayed in step 305. The time remaining until the sleep mode may be displayed as a countdown in seconds. In the present example, since the notice screen is set to be displayed five seconds prior to the expiration of the sleep mode timer, when the standby screen is switched to the notice screen 400, '5 seconds' is initially displayed at the same time. As the countdown continues, '4 seconds,' '3 seconds,' '2 seconds,' and '1 second' are subsequently displayed.

The timer setting area 420 includes a band area 450 and a setting button 460 that indicates a particular part of the band area 450 and is movable along the band area 450 corresponding to the user input to set the value of the sleep mode timer 240.

Next, referring back to FIG. 3, while the notice screen 400 is displayed on the display unit 270, the controller 230 determines whether a sleep mode timer 240 temporary setting command is received from the user, in step 320. When the sleep mode timer temporary setting command is not received from the user, the controller 230 determines whether the sleep mode timer setting is set on default setting, in step 350. Here, the default setting refers to the setting received from the user in step 305, not the sleep mode timer setting that is temporarily set.

When the controller determines that the sleep mode timer is set on the default setting in step 350, the controller 230 proceeds to step 365 to enter into the sleep mode. When the controller 230 determines that the sleep mode timer is not set on the default setting in step 350, the controller 230 proceeds to step 360 to set the sleep mode timer setting as the default setting and proceeds to step 365 to control the display unit 270 to enter into the sleep mode.

Figure 5:
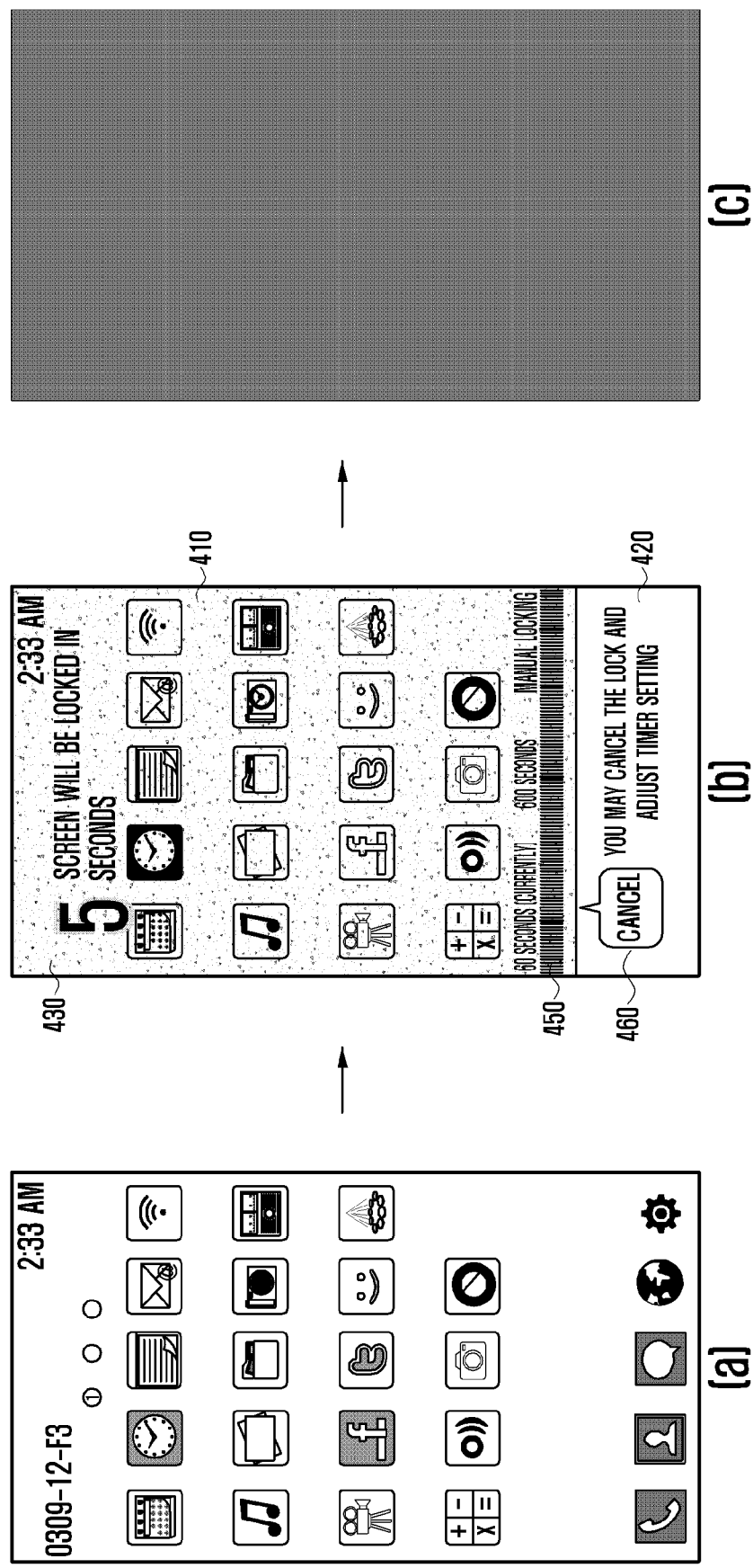
FIG. 5(a) is a diagram illustrating a standby screen in a portable terminal according to an embodiment of the present invention.
FIG. 5(b) is a diagram illustrating a notice screen for displaying a sleep mode timer according to an embodiment of the present invention.
FIG. 5(c) is a diagram illustrating a screen for a slee mode in a sortable terminal after the sleep mode is performed according to an embodiment of the present invention.

A process of the controller 230 entering into the sleep mode in step 350 is shown in FIG. 5. FIG. 5 is a diagram illustrating a process of entering into a sleep mode in a portable terminal according to an embodiment of the present invention.

FIG. 5(a) corresponds to a general standby screen of the portable terminal. When a user input is not received during a predetermined period of time while the standby screen is displayed, the portable terminal displays the notice screen as shown in FIG. 5(b). When the sleep mode timer temporary setting command is not received from the user while the notice screen is displayed on the display unit 270, the portable terminal enters the sleep mode, as shown in FIG. 5(c).

Meanwhile, the controller 230 determines whether the portable terminal 200 is loading a content prior to displaying the notice screen 400, and upon determining that content is not being loaded, the controller 230 controls the display unit 270 not avoid displaying the notice screen. Through the above process, the controller 230 displays the notice screen only when needed for the user.

Again, referring back to FIG. 3, when the sleep mode timer temporary setting command is received from the user, the controller 230 drives the sleep mode timer 240, in step 325, and enters into the screen maintaining mode. in step 330. A process of temporarily setting the sleep mode timer 240 is shown in FIG. 6.

FIG. 6 is a diagram illustrating a screen for temporarily setting a sleep mode timer 240 according to an embodiment of the present invention.

Referring to FIG. 6, the sleep mode timer temporary setting command is input when the user touches the setting button 460 on the notice screen 400.

When the user touches the setting button 460, the displayed countdown of remaining time until the sleep mode within timer display area 430, as shown in FIG. 4, is removed from the display, and a timer setting time 600, which corresponds to the temporary timer setting corresponding to a particular part of the band area 450 in which the setting button 460 is located, is displayed. In FIG. 6, since the setting button 460 currently indicates '60 seconds' in the band area 450, the timer setting time 600 indicates '60 seconds.'

When the user touches the setting button 460, but does not perform a drag operation, the setting time is not changed, and the sleep mode timer is temporarily set according to the timer setting time corresponding to the particular part of the band area 450 at which the setting button 460 is currently located. In the present example, '60 seconds', which is currently indicated by the setting button 460, is temporarily set as the sleep mode timer setting. A process of entering into the screen maintaining mode according to an embodiment of the present invention is shown in FIG. 7.

Figure 7:
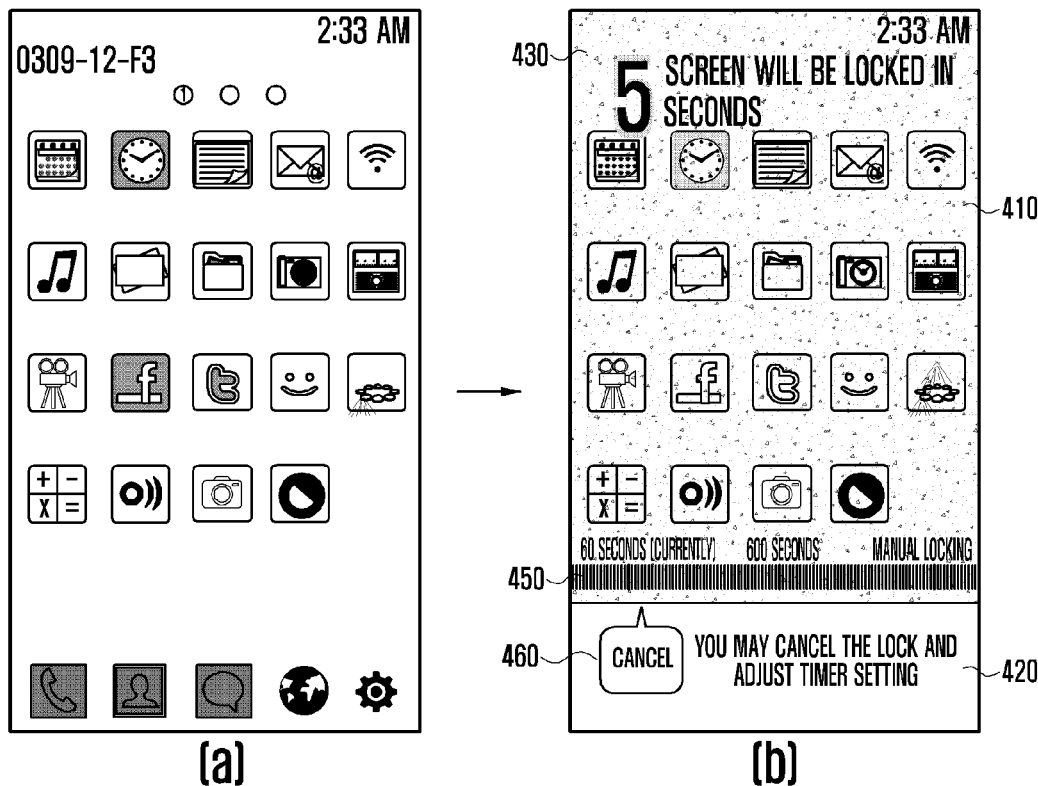
FIG. 7(a) is a diagram illustrating a standby screen in a portable terminal according to an embodiment of the present invention.
FIG. 7(b) is a diagram illustrating a notice screen for displaying a sleep mode timer according to an embodiment of the present invention.
FIG. 7(c) is a diagram illustrating a screen for temporarily setting a sleep mode timer according to an embodiment of the present invention.
FIG. 7(d) is a diagram illustrating a screen for a screen maintaining mode after temporarily setting a sleep mode timer according to an embodiment of the present invention.
Figure 7:
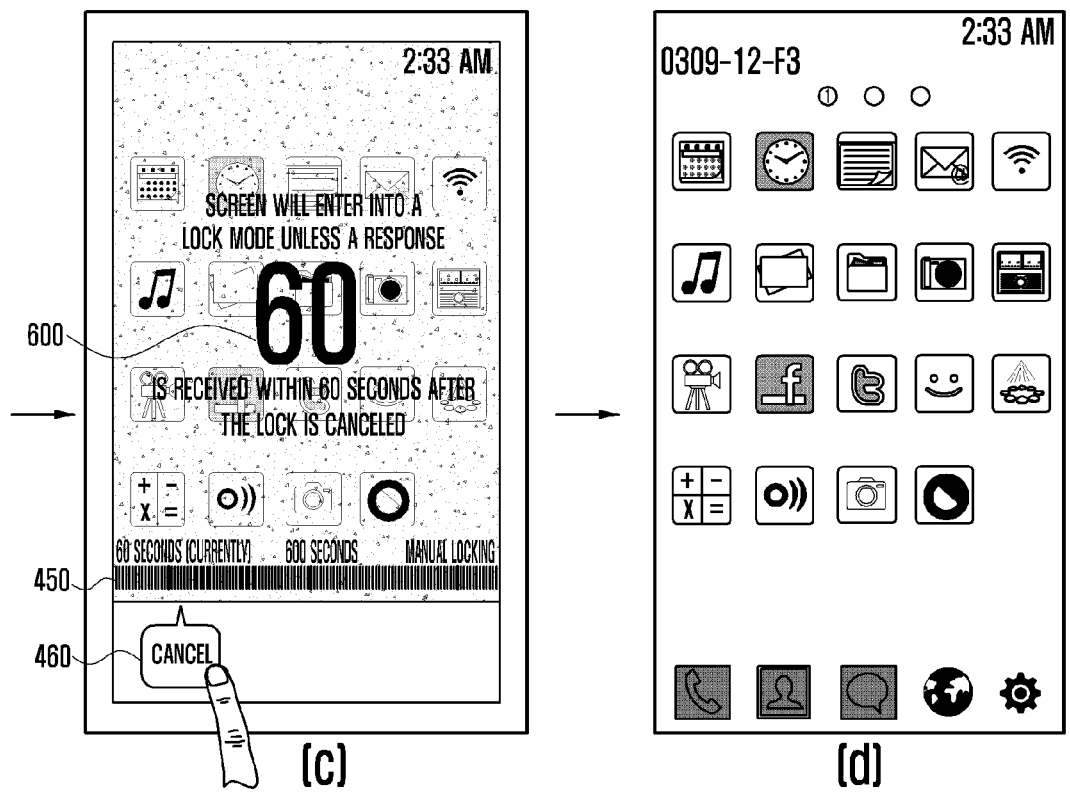

FIG. 7 is a diagram illustrating a process of entering into a screen maintaining mode after temporarily setting a sleep mode timer according to an embodiment of the present invention.

FIG. 7(*a*) corresponds to a general standby screen of the portable terminal. When user input is not received during a predetermined period of time while the standby screen is displayed, the portable terminal displays the notice screen as shown in FIG. 7(*b*). When the sleep mode timer temporary setting command is received from the user while the notice screen is displayed on the display unit 270, the display of countdown of time shown in FIG. 7(*b*) is removed from timer display area 430, and the timer setting time 600 corresponding to the particular part of the band area 450 in which the setting button 460 is located is displayed, as shown in FIG. 7(*c*). When the setting time is not changed (i.e., when the user selects, but does not drag setting button 460, as shown in FIG. 7(*b*) and FIG. 7(*c*)), the portable terminal transitions to the screen maintaining mode shown in FIG. 7(*d*).

When the user touches the setting button 460 and performs the drag operation, the temporary setting time is changed. In other words, the timer setting time 600 is displayed in the timer display area 410 according to movement of the setting button 460 along the band area 450, while the sleep mode timer 240 is set corresponding to the displayed time 600. When moving the setting button 460 along the band area 450, the setting button 460 is moved by sliding the setting button 460.

Figure 8:
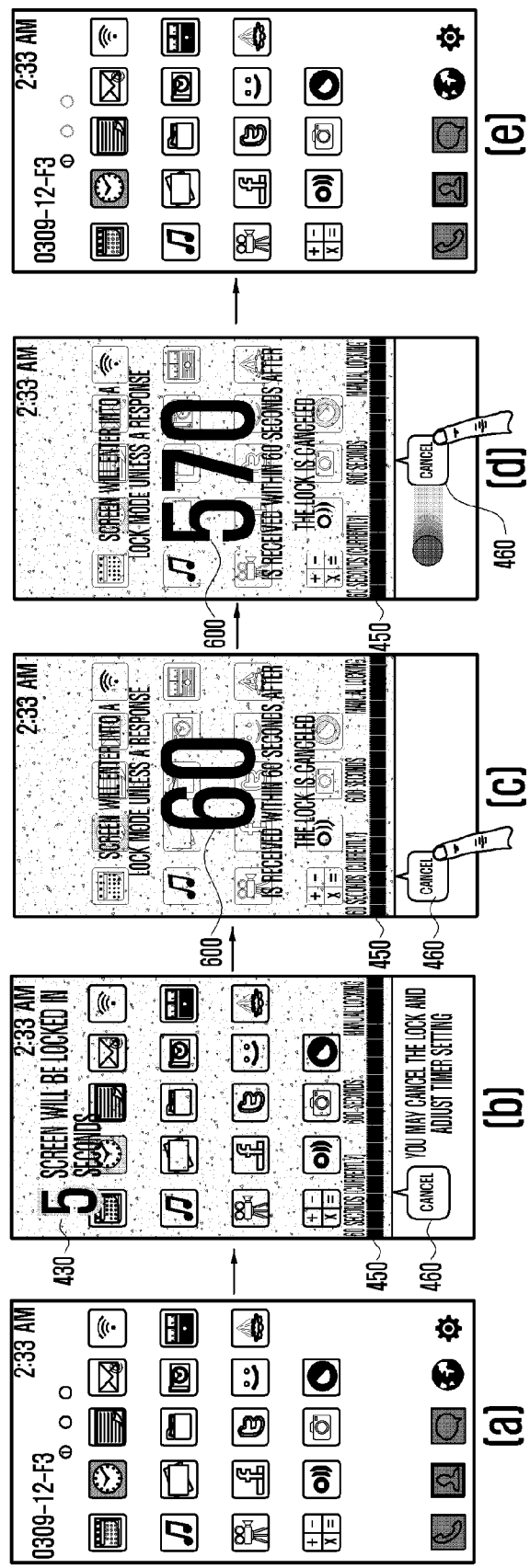
FIG. 8(a) is a diagram illustrating a standby screen in a portable terminal according to an embodiment of the present invention.
FIG. 8(b) is a diagram illustrating a notice screen for displaying a sleep mode timer according to an embodiment of the present invention.
FIG. 8(c) is a diagram illustrating a screen for temporarily setting a sleep mode timer according to an embodiment of the present invention.
FIG. 8(d) is a diagram illustrating a screen for temporarily setting a sleep mode timer changed by a user according to an embodiment of the present invention.
FIG. 8(e) is a diagram illustrating a screen for a screen maintaining mode after temporarily setting a sleep mode timer according to another embodiment of the present invention.

FIG. 8 is a diagram illustrating a process of entering into a screen maintaining mode after temporarily setting a sleep mode timer according to an embodiment of the present invention.

FIG. 8(*a*) depicts a general standby screen of the portable terminal. When user input is not received during a predetermined period of time while the standby screen is displayed, the portable terminal displays a notice screen in a timer display area 430, which includes a countdown of the remaining time until the sleep mode is entered, as shown in FIG. 8(*b*). When the sleep mode timer temporary setting command is received from the user while the notice screen is displayed on the display unit 270, the notice screen is removed, and a timer setting time corresponding to a particular part of the band area 450 in which the setting button 460 is located is displayed in an area 600, as shown in FIG. 8(*c*).

When the user touches the setting button 460 and changes the setting time, the sleep mode timer is temporarily set to the timer setting time corresponding to a changed particular part of the band area 450 at which the setting button 460 is located. For example, as shown in FIG. 8(*d*), when the user drags and drops the setting button 460 at a part of the band area 450 corresponding to '570 seconds,' '570 seconds' becomes the temporarily set sleep mode timer, as indicated by the setting button 460. When the sleep mode timer setting is temporarily set, the screen maintaining mode is entered as shown in FIG. 8(*d*).

The sleep mode timer setting set in step 320 is a temporary value, and when the sleep mode timer that is temporarily set expires after driving the sleep mode timer, or when a forcible sleep mode entry command is received, the temporary setting of the sleep mode timer is canceled and reset as the default setting stored in the storage unit 220.

Again, referring now back to FIG. 3, the controller 230 determines whether a time point for displaying the notice screen 400 has arrived, in step 335. The display time point of the notice screen, which is set in step 305, is a time point for displaying the notice screen prior to the expiration of a temporarily set sleep mode timer 240. When the controller 230 determines that the time point for displaying the notice screen 400 has arrived, the controller 230 returns to step 315 to display the notice screen 400.

In step 335, when the controller 230 determines that the time point for displaying the notice screen 400 has not arrived, the controller 230 determines whether a forcible sleep mode entry command is received, in step 345. The forcible sleep mode entry command may be received through a particular key input of the key input unit 210 of the potable terminal 200. When the controller 230 does not receive the forcible sleep mode entry command, the controller 230 maintains the screen maintaining mode, in step 340.

Upon a determination that the controller 230 has received the forcible sleep mode entry command in step 345, the controller 230 sets the sleep mode timer to the default setting, in step 360, and controls the display unit 270 to enter into the sleep mode, in step 365.

The sleep mode timer setting set in step 320 is a temporary value, and when the temporarily set sleep mode timer expires after driving the sleep mode timer, or when the forcible sleep mode entry command is received, the temporary setting of the sleep mode timer is canceled and reset according to the default setting stored in the storage unit 220.

According to embodiments of the present invention, before entering into the sleep mode of the portable terminal, the notice screen is displayed in order to temporarily set the sleep mode timer setting and operate the screen maintaining mode, such that the portable terminal does not switch to the sleep mode until the timer expires, thereby enhancing user convenience by informing the user of the time remaining until the sleep mode is entered and enabling the user to temporarily re-set the sleep mode timer setting.

Although embodiments of the present invention have been described in detail hereinabove, many variations and modifications of the basic inventive concepts described herein still fall within the spirit and scope of the present invention, as defined by the appended claims and their equivalents.

What is claimed is:

1. A method of controlling a sleep mode of a portable terminal, the method comprising:

setting a sleep mode timer according to a default setting;

displaying, upon reaching a predetermined time point before expiration of the sleep mode timer, a notice screen including a timer display area and a timer setting area for re-setting the sleep mode timer according to a temporary setting;

receiving a sleep mode timer temporary resetting command to re-set the sleep mode timer by changing a setting time of the sleep mode timer though a user's touch while the notice screen is displayed; and entering a screen maintaining mode in which the reset sleep mode timer is driven based on the changed setting time.

2. The method of claim 1, further comprising:

entering into the sleep mode when a forcible sleep mode entry command is received while the portable terminal is in the screen maintaining mode.

3. The method of claim 2, further comprising cancelling the temporary re-setting of the sleep mode timer and restoring the default setting of the sleep mode timer, when the temporarily reset sleep mode timer expires, or when the forcible sleep mode entry command is received.

4. The method of claim 1, wherein the timer display area displays a remaining time until the sleep mode is entered according to the sleep mode timer or a timer setting time corresponding to the sleep mode timer temporary resetting command.

5. The method of claim 4, further comprising, when the notice screen is displayed, the remaining time is first displayed, and the sleep mode timer is temporarily set removing the display of the remaining time until the sleep mode is entered and displaying the timer setting time in the timer display area.

6. The method of claim 1, wherein the timer setting area includes a band area corresponding a range of times available for temporarily re-setting the sleep mode timer, and a setting button indicating a particular part of the band area, such that the setting button is movable along the band area corresponding to a user input.

7. The method of claim 6, wherein temporarily re-setting the sleep mode timer setting comprises:

displaying a timer setting time in the timer display area corresponding to movement of the setting button along the band area and setting the sleep mode timer setting corresponding to the displayed timer setting time.

8. The method of claim 7, wherein the setting button is moved along the band area by a sliding operation.

9. The method of claim 1, wherein, if the portable is not downloading content when reaching the predetermined time point before expiration of the sleep mode timer, the portable terminal does not display the notice screen.

10. A portable terminal having a sleep mode control function, the portable terminal comprising:

a key input unit for receiving a user command corresponding to a timer setting;

a storage unit for storing the timer setting;

a controller for setting a sleep mode timer according to a default setting, for controlling, upon reaching a predetermined time point before expiration of the sleep mode timer, display of a notice screen including a timer display area and a timer setting area for re-setting the sleep mode timer according to a temporary setting, for receiving a sleep mode timer temporary resetting command to re-set the sleep mode timer by changing a setting time of the sleep mode timer though a user's touch while the notice screen is displayed and for entering a screen maintaining mode in which the reset sleep mode timer is driven based on the changed setting time; and a display unit for displaying the notice screen.

11. The portable terminal of claim 10, wherein, the controller controls the display unit to enter into the sleep mode when a forcible sleep mode entry command is received while the portable terminal is in the screen maintaining mode.

12. The portable terminal of claim 11, wherein the controller cancels the temporary re-setting of the sleep mode timer and restores the default setting of sleep mode timer, when the temporarily re-set sleep mode timer expires, or when the forcible sleep mode entry command is received.

13. The portable terminal of claim 10, wherein the timer display area displays a timer setting time corresponding to a time remaining until the sleep mode is entered or corresponding to the sleep mode timer temporary resetting command.

14. The portable terminal of claim 13, wherein the controller controls the display unit such that the remaining time is removed and the timer setting time is displayed, when the notice screen is displayed, the remaining time is first displayed, and the sleep mode timer is temporarily set.

15. The portable terminal of claim 10, wherein the timer setting area includes a band area corresponding a range of times available for temporarily re-setting the sleep mode timer, and a setting button indicating a particular part of the band area, such that the setting button is movable along the band area corresponding to a user input.

16. The portable terminal of claim 15, wherein, when the sleep mode timer setting is temporarily re-set, the controller controls to display a timer setting time in the timer display area corresponding to movement of the setting button along the band area and controls to set the sleep mode timer setting corresponding to the displayed timer setting time.

17. The portable terminal of claim 16, wherein the setting button is moved along the band area by a sliding operation.

18. The portable terminal of claim 10, wherein, if the portable is not downloading content when reaching the predetermined time point before expiration of the sleep mode timer, the portable terminal does not display the notice screen.

* * * * *